United States Patent
Roddy

(10) Patent No.: US 10,446,809 B1
(45) Date of Patent: Oct. 15, 2019

(54) PORTABLE MODULAR ENERGY STORAGE

(71) Applicant: Daniel Francis Roddy, Cabin John, MD (US)

(72) Inventor: Daniel Francis Roddy, Cabin John, MD (US)

( * ) Notice: Subject to any disclaimer, the term of this patent is extended or adjusted under 35 U.S.C. 154(b) by 0 days.

(21) Appl. No.: 16/371,275

(22) Filed: Apr. 1, 2019

Related U.S. Application Data

(63) Continuation of application No. 16/193,180, filed on Nov. 16, 2018, now Pat. No. 10,355,254, which is a continuation-in-part of application No. 16/146,777, filed on Sep. 28, 2018.

(51) Int. Cl.
*H01M 2/10* (2006.01)

(52) U.S. Cl.
CPC ....... *H01M 2/1005* (2013.01); *H01M 2/1077* (2013.01); *H01M 2220/20* (2013.01)

(58) Field of Classification Search
CPC ..... H01M 2/1005; H01M 2/1077; B60L 1/00; B60L 5/00; B60L 53/00; B60L 53/20; B60L 58/00; B60L 50/60; B60L 50/70; B60L 58/18; B60L 3/00; B60L 3/0046; B60L 58/16; B60K 1/04; B60S 5/06
USPC ......... 320/107, 112, 116, 119, 124, 127, 130
See application file for complete search history.

(56) References Cited

U.S. PATENT DOCUMENTS

| | | | |
|---|---|---|---|
| 4,334,819 A * | 6/1982 | Hammerslag | B60K 1/04 414/395 |
| 4,450,400 A * | 5/1984 | Gwyn | B60K 1/04 320/109 |
| 5,427,194 A | 6/1995 | Miller | |
| 5,549,443 A * | 8/1996 | Hammerslag | B60K 1/04 104/34 |
| 5,668,460 A * | 9/1997 | Lashlee | B60S 5/06 104/34 |
| 5,668,490 A | 9/1997 | Mitra et al. | |
| 5,711,648 A * | 1/1998 | Hammerslag | B60K 1/04 414/800 |
| 5,927,938 A * | 7/1999 | Hammerslag | B60K 1/04 414/809 |
| 5,951,229 A * | 9/1999 | Hammerslag | B60K 1/04 414/398 |
| 7,074,518 B2 | 7/2006 | Vigier et al. | |
| 7,074,528 B2 | 7/2006 | Schacht et al. | |
| 7,602,143 B2 * | 10/2009 | Capizzo | B60K 15/063 320/109 |

(Continued)

OTHER PUBLICATIONS

Non-Final Rejection entered in U.S. Appl. No. 16/193,180, 6 pages.

(Continued)

*Primary Examiner* — Kaitlin S Joerger
(74) *Attorney, Agent, or Firm* — Shami Messinger PLLC

(57) ABSTRACT

In one embodiment, a system for deploying batteries, for example in an electric vehicle, includes a battery belt for mechanically linking multiple batteries together, a conduit having one or more operational zones each with an output, the operational zones each establishing an electrical connection between the output and batteries in the operational zone, and an actuator for selectively moving batteries into and out of the operational zones. Resting zones may also be provided. The batteries can be connected in series or in parallel and can be individually removed and replaced by an exchanger.

28 Claims, 19 Drawing Sheets

(56) References Cited

U.S. PATENT DOCUMENTS

| | | | |
|---|---|---|---|
| 8,138,720 B2 | 3/2012 | Snyder et al. | |
| 8,461,804 B1 * | 6/2013 | Capizzo | B60K 15/063 320/109 |
| 9,187,004 B1 * | 11/2015 | Davis | B60S 5/06 |
| 9,815,470 B2 | 11/2017 | Luther et al. | |
| 2006/0208698 A1 * | 9/2006 | Maguire | H01M 10/6566 320/116 |
| 2009/0096418 A1 * | 4/2009 | Abadia | H01G 9/14 320/116 |
| 2010/0143771 A1 | 6/2010 | Jeong et al. | |
| 2012/0013340 A1 | 1/2012 | Yuasa et al. | |
| 2012/0056585 A1 * | 3/2012 | Mariels | H02J 7/0016 320/116 |
| 2012/0083948 A1 * | 4/2012 | Tate, Jr. | B60L 58/12 701/22 |
| 2012/0187898 A1 * | 7/2012 | Nysen | H01M 10/052 320/103 |
| 2012/0187909 A1 * | 7/2012 | Nysen | H01M 10/425 320/118 |
| 2018/0041053 A1 * | 2/2018 | Capizzo | H02J 7/0027 |

OTHER PUBLICATIONS

Notice of Allowance and Issue Information entered in U.S. Appl. No. 16/193,180.

* cited by examiner

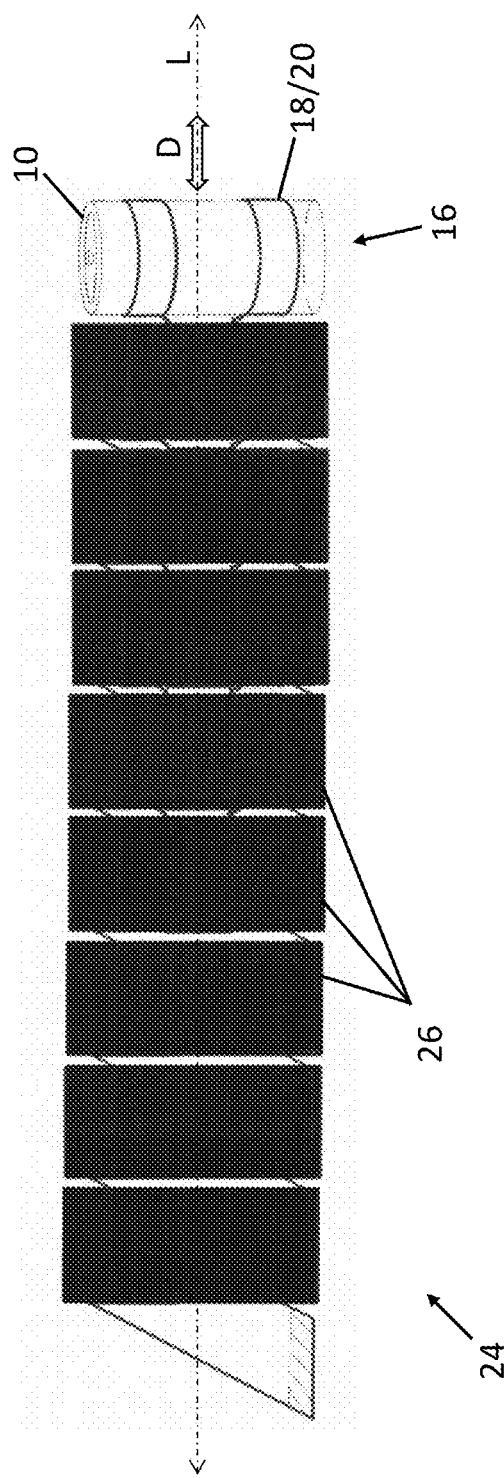

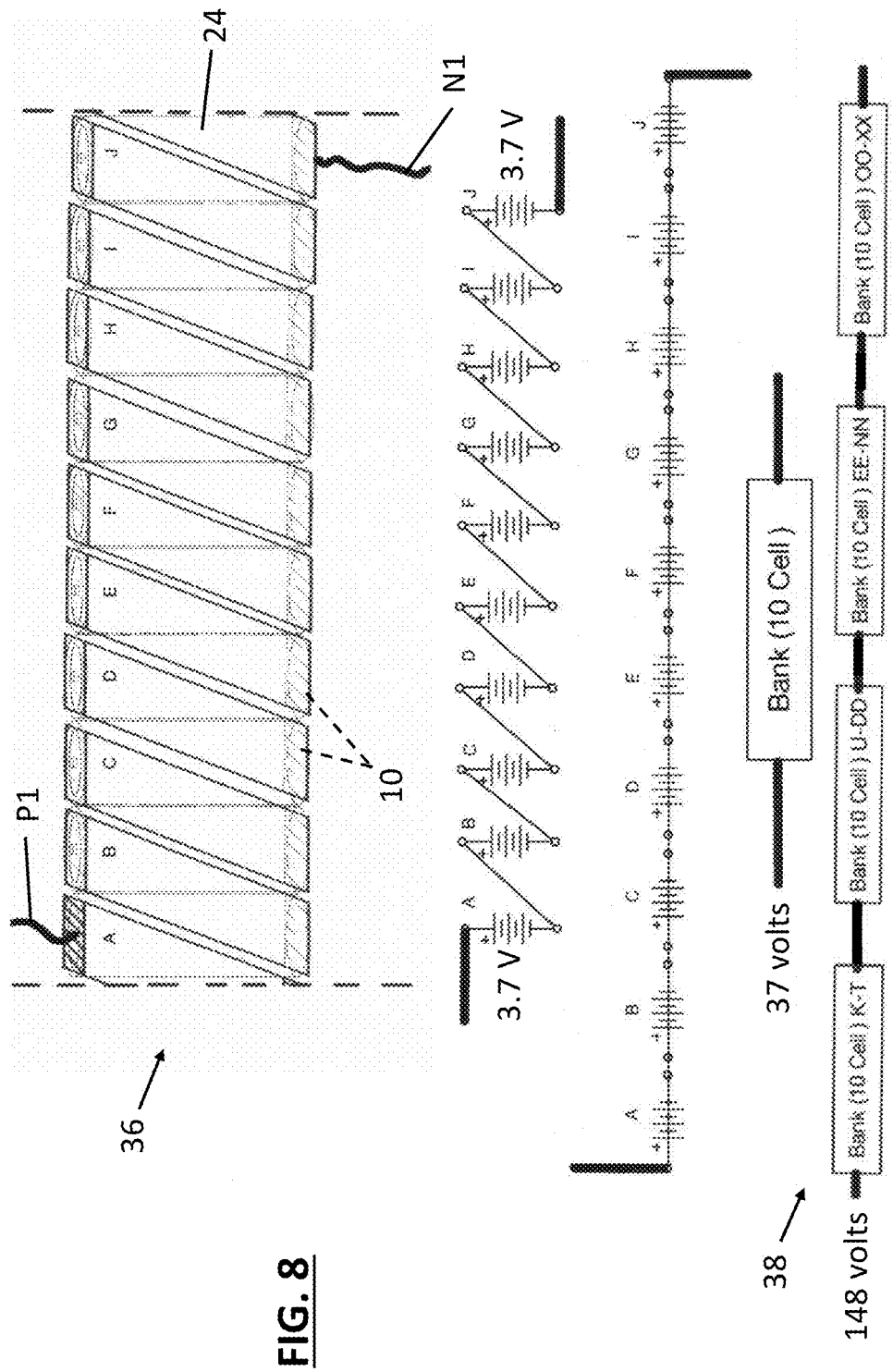

PORTABLE MODULAR ENERGY STORAGE

SUMMARY OF RELATED APPLICATIONS

This application is a continuation of U.S. patent application Ser. No. 16/193,180, filed on Nov. 16, 2018, which is a continuation-in-part of U.S. patent application Ser. No. 16/146,777, filed on Sep. 28, 2018; and claims the benefit under 35 U.S.C. §§ and 119 and 120 and 37 CFR1.78(a) of the filing dates of these applications, the contents of which are incorporated herein by reference in their entirety.

TECHNICAL FIELD

The present disclosure relates generally to energy storage, for example in the form of a portable battery pack usable for powering electrical devices such as vehicles.

BACKGROUND

Current rechargeable battery systems involve a charge cycle and discharge cycle. There is a need for thermal regulation or other current flow control measures that prevent too much current from being drawn from the unit energy cells causing overheating of the energy interface and the individual cells. In addition, with reference to FIG. 1, there is a need for a cool-down period between charging the battery and its use (discharging the battery), as well as between use and when the battery can be charged again. Fast charging or discharging in particular can be especially prone to overheating the battery. Failure to accommodate the cool-down period can result in permanent damage to the battery cells or possible fire or explosion. The difficulty with this cycle is that it may be interrupted by user demand, requiring use of the battery when it is in the middle of charging, or when immediate charging for immediate use are desired. Any additional thermal discharge (heating) results in loss of energy and waste heat as opposed to charge. An illustrative case is electric vehicles, wherein a discharging period, as the foot pedal is pressed to apply power to the motor, is abruptly interrupted by a charging period when the driver releases the foot pedal and applies the brakes to initiate regenerative braking; only to then release the brake and press the pedal again to apply power to the motor and initiate discharging again, and so on.

In addition, current systems suffer from a difference in the charge levels, or from any defect or problem with a single cell. The defect can be from localized chemical or mechanical failure or overheating, charge level difference, or a manufacturing defect. For example, when the charge of a single cell in an array of cells is lower than the rest of the cells in the array, the array can only charge to the level of the lowest cell in the array, in effect limiting the useful potential of the entire array to that of a single cell. FIG. 2 shows how the array or bank of batteries, three in this case, on discharge can only discharge the amount of charge in the lowest level cell in the array (cell 1). Cells 2 and 3 have unusable charge remaining. There are methods for conditioning the whole array, but these add discharge and charge cycles that involve complete discharge of the cells, which over time puts wear on the entire array, shortening its useful life. For these reasons there is a need for selective removal or replacement of a single cell or multiple cells.

There is also a problem with the versatility of existing battery systems. The battery packs come in different shapes and sizes and have different voltages, built to individual specifications that are not compatible with each other, even though internally many are based on the same unit cell battery.

When these battery packs no longer hold useful charge, essentially reaching the end of their effective lives, they are discarded. The packs containing these batteries are frequently only suffering from the condition of one or two cells which if replaced would return the pack to serviceability. Replacing the defective cells could return the pack to useful service, in this way extending the useful life significantly. In addition, the less effective cells of these packs can be used in less demanding applications that do not require their full capacity. Both of these solutions would extend the life of the battery systems and reduce the amount of waste significantly.

Current vehicle battery systems do not allow for the rapid change of the battery packs. This requires vehicles to utilize plug-in chargers. Charge for these systems takes several hours for the cool, charge, cool and discharge cycle. Users driving on longer trips than the effective range of the vehicle's battery pack, or that require immediate use in the middle of the charging cycle, place undue demand on the battery packs. This can lead to damage to the battery packs from overheating and potentially leading to fires.

OVERVIEW

As described herein, an array of batteries are linked together mechanically in a flexible, serpentine belt arrangement that permits easy handling and manipulation of the array, and selective change-out and replacement of individual cells. The entirety of these linked batteries, or subsets thereof, can be electrically connected together as banks to provide selectable denominations of power.

Some advantages of the arrangements described herein include extending range of existing electric vehicles, such as trucks, forklifts, aircraft, water craft (including submarines), trains, hover crafts, motorbikes, and so on; providing retrofit to used vehicles providing rapid change of energy packs becomes an option, akin to pumping gas at a gas station; the ability to selectively change out individual cells in a pack for conditioning and fire safety; and providing rapid jettison of the energy units (cells) to prevent vehicle fire. Other advantages include flexible applications: home reserve power (that fits in the walls of a house for instance) and portable power units. Anywhere that a hose or conduit can be run can be adapted to similarly house a battery pack that is rapidly replaceable and serviceable down to the unit cell. Trucks, scooters, bikes, hover boards, undersea systems, drones, boats, data centers, government installations, uninterruptible power supplies, and military systems are examples of potential beneficiaries of this solution.

The arrangements as described herein open up many other markets and options, because the battery packs are easy to handle. Batteries can be charged from solar power or other power source, or charged at night at discounted rates from the utility grid for use during the day. The batteries can be grouped in subsets for charging, in cases where charging capacity is limited to a certain number of batteries, with one subset being charged at a time until all the batteries are charged. One application is to transport the battery pack to a first installation, such as the site of windmill or wind farm or other source of power, charge the battery pack there, in its entirety at once, or in subsets as mentioned above, then deliver it to a second installation, such as an individual vehicle or to station for customer pickup or use. Individuals can charge the battery packs at their house and sell/swap the packs with others. A whole industry of individual chargers in homes can eliminate the need and cost for a distribution system. This could provide a distributed energy solution for rural areas or developing countries and for use by the military and for disaster relief. It provides a renewable energy distribution solution without the wired distribution system requirements. Local communities can harness sun, water, wind, and other energy sources to charge energy units and distribute them for use to individuals and families to run home electrical systems, refrigeration, electrical vehicles, or medical equipment.

Described herein is a system for deploying batteries including a battery belt for mechanically linking multiple batteries together, a conduit having an operational zone with an output, the operational zone establishing an electrical connection between the output and batteries in the operational zone, and an actuator for selectively moving batteries into and out of the operational zone.

Also described herein is an electric vehicle including a drive system, a battery belt for mechanically linking multiple batteries together, a first conduit having a first operational zone for establishing an electrical connection between the drive system and batteries in the first operational zone, and an actuator for selectively moving batteries into and out of the first operational zone.

Also described herein is an electric vehicle including a drive system, a battery belt for mechanically linking multiple batteries together, a first conduit having a first operational zone with an output, the first operational zone establishing an electrical connection between the output and batteries in the first operational zone, and an actuator for selectively moving batteries into and out of the first operational zone.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

In the drawings:

FIG. 7 is a side view of a battery conduit in accordance with some embodiments;

FIG. 8 is a schematic diagram of system for deploying series-connected batteries in an operational zone of conduit in accordance with certain embodiments;

DESCRIPTION OF EXAMPLE EMBODIMENTS

The following description is illustrative only and is not intended to be in any way limiting. Other embodiments will readily suggest themselves to those of ordinary skill in the art having the benefit of this disclosure. Reference will be made in detail to implementations of the example embodiments as illustrated in the accompanying drawings. The same reference indicators will be used to the extent possible throughout the drawings and the following description to refer to the same or like items.

In the description of example embodiments that follows, references to "one embodiment", "an embodiment", "an example embodiment", "certain embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. The term "exemplary" when used herein means "serving as an example, instance or illustration." Any embodiment described herein as "exemplary" is not necessarily to be construed as preferred or advantageous over other embodiments.

In the interest of clarity, not all of the routine features of the implementations described herein are shown and described. It will be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 3:
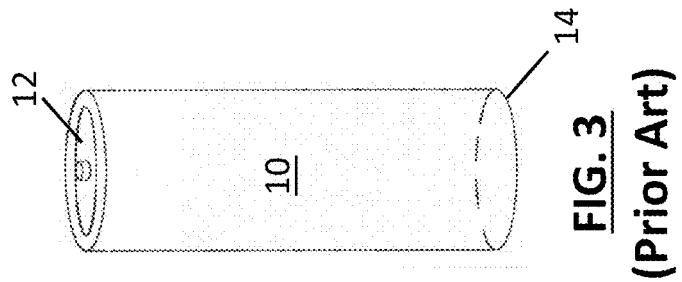
FIG. 3 is a diagram of a standard conventional battery.
Figure 2:
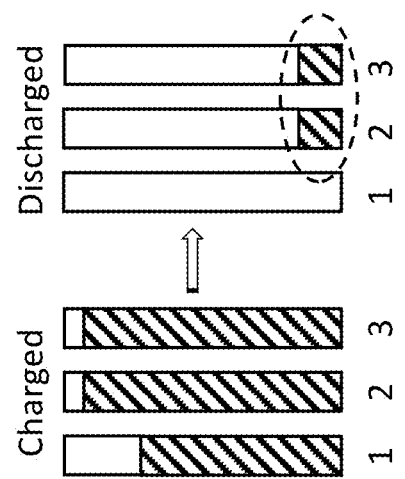
FIG. 2 is a diagram showing the limitations on charge and discharge of a conventional array of batteries.
Figure 1:
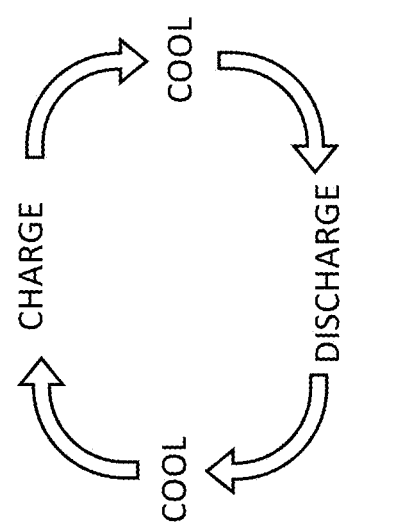
FIG. 1 is a battery charge/cool/discharge/cool cycle diagram.

For purposes of this description, the terms battery "pack," "array," or "bank" will refer to a set of one or more individual batteries that may be connected together for charging, discharging or both. Each individual battery may also be referred to as a "cell." Moreover, each battery or cell will be understood to describe a rechargeable or single-use chemical battery or other energy storage device. Examples of rechargeable or single-use chemical batteries include, but are not limited to, lithium-ion and nickel cadmium batteries of various sizes and form factors, and of various power capacities and ratings as defined in terms power, voltage and current. One example form factor is shown in FIG. 3, in which a substantially cylindrical conventional battery 10 has a positive terminal 12 and a negative terminal 14. Specific examples of batteries include 18650 Panasonic batteries and the like, A-size, AA-size, AAA-size, C-size, D-size, batteries, and so on. More generally, however, the term battery or cell will be understood to refer to any energy or charge storage device and includes, inter alia, capacitors and super-capacitors.

Figure 4:
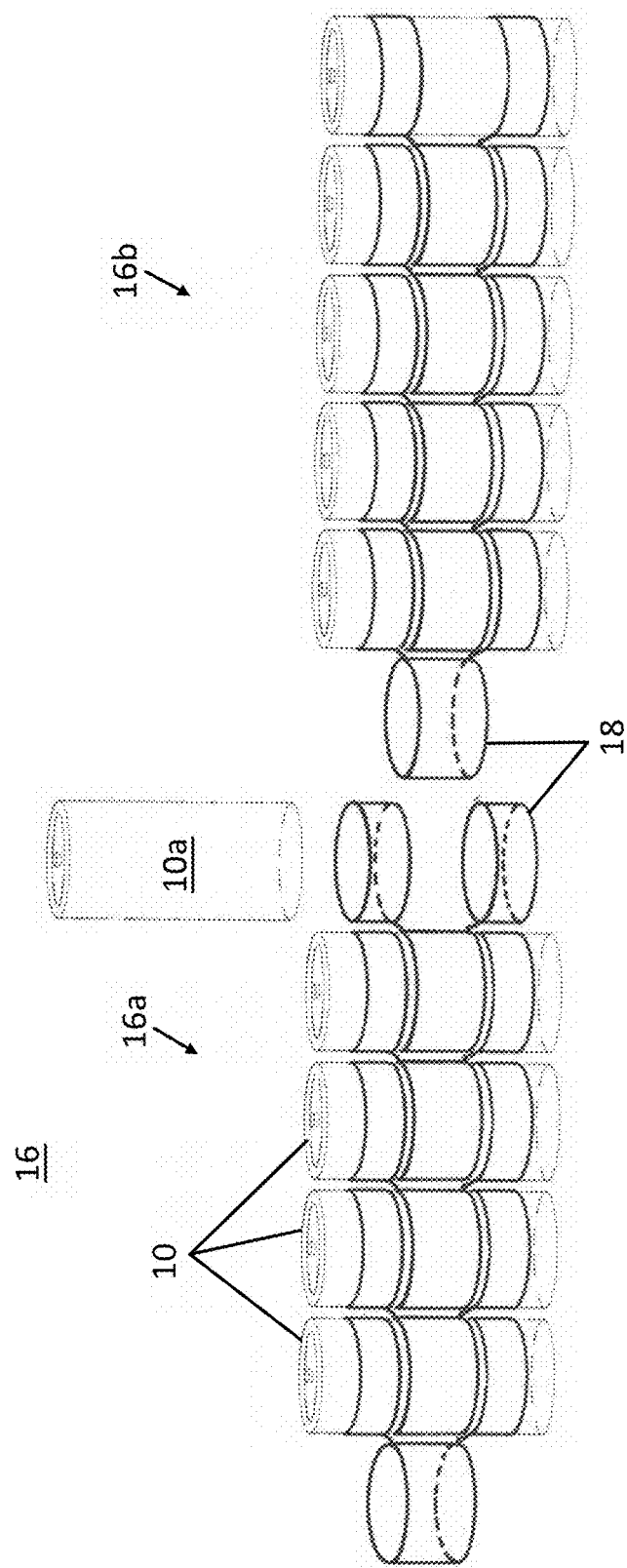
FIG. 4 is a side view of a flexible severable battery belt 16 for mechanically linking together one or more batteries 10 in a linear fashion in accordance with some embodiments.
Figure 4A:
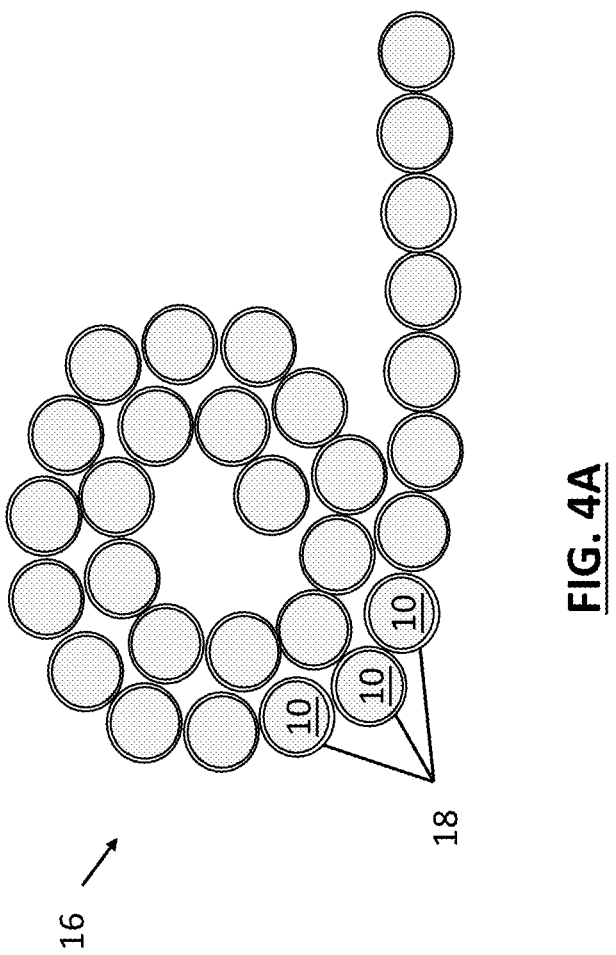
FIG. 4A is a top view of coiled battery belt in accordance with certain embodiments.

FIG. 4 is a side view of a flexible severable battery belt 16 for mechanically linking together one or more batteries 10 in a linear fashion in accordance with some embodiments. The belt 16 comprises a plurality of belt links 18 that are coupled to one another by the batteries 10 retained in them. Removal of a battery that is between two links, such as battery 10a in the drawing, results in severing of the belt 16 at that juncture into two detached battery belt segments, 16a and 16b. When in place, each battery 10 forms a mechanical connection between two consecutive belt links 18. The connection thus formed is flexible, with the two consecutive belt links 18 being pivotable, to a limited extent, around the linking battery, resulting in an overall flexible, serpentine battery belt arrangement. Such flexibility permits coiling the battery belt, as seen for example in FIG. 4A, or configuring it in an S-shape or any other shape that achieves compactness, ease of handling or packing, and conformance with different-shaped containers and conduits, improved heat exchange (for cooling), or myriad other advantages.

Figure 5:
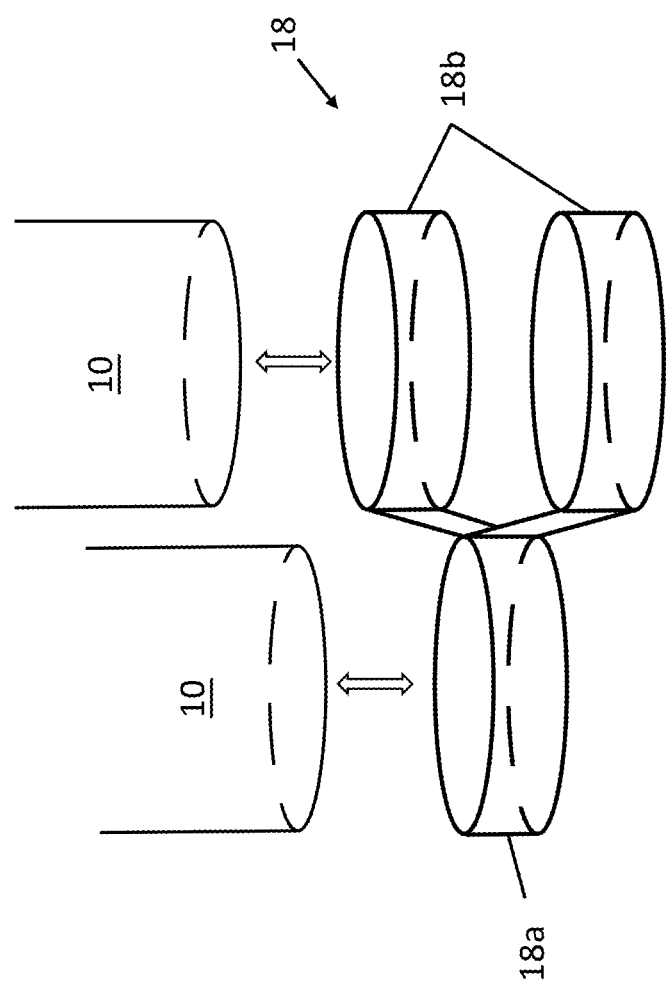
FIGS. 5 and 6 show different embodiments of links of a battery belt in accordance with certain embodiments.
Figure 6:
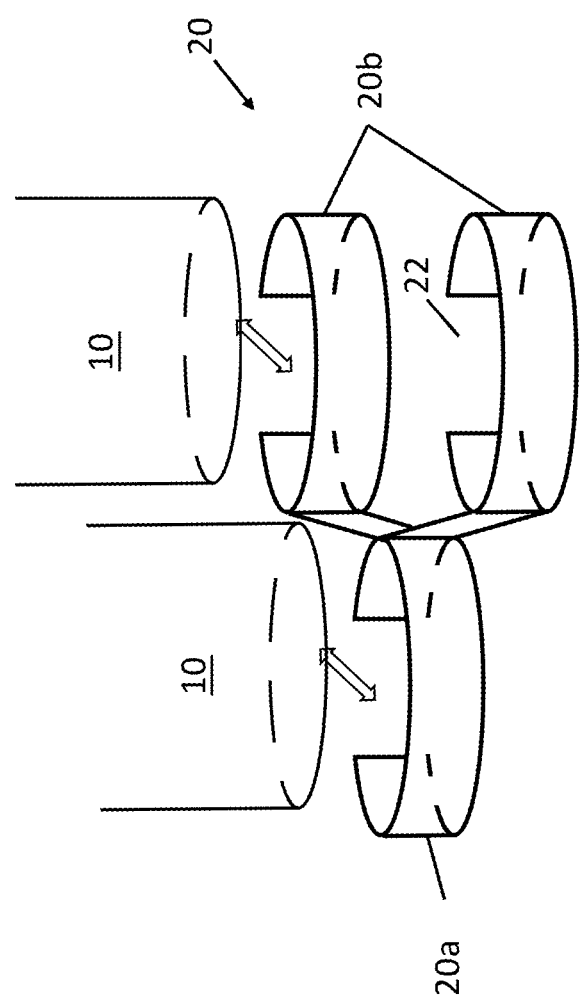

FIGS. 5 and 6 show different embodiments of the links of a belt such as battery belt 16. In FIG. 5, link 18 is a ring type link, in which one side comprises a single ring 18a, and the other side comprises dual, axially aligned rings 18b. The rings are sized to accommodate a battery 10 that is removably slidable into place in the rings as shown by the double-headed arrows. A limited interference fit may be employed in some embodiments to ensure the batteries are maintained in place in the ring. A ring 18a of one belt link fits, in axial alignment, between two rings 18b of a next consecutive belt link, to form a sequence of links that are coupled together by batteries interposed between them. In FIG. 6, link 20 is a C-clamp type link, in which one side comprises a single C-clamp 20a, and the other side comprises dual, axially aligned C-clamps 20b. The opening 22 of each C-clamp is smaller than the diameter of the batteries 20, and the C-clamps 20a and 20b are made of a material that is flexible enough to permit removability of the batteries 10 laterally, as shown by the double-headed arrows in FIG. 6, in addition to axially in the manner of the double-headed arrows of FIG. 5. Again a ring 20a of one belt link fits, in axial alignment, between two rings 20b of a next consecutive belt link, to form a sequence of links that are coupled together by batteries interposed between them. Of course it is also contemplated to provide a battery belt with links that are linked together regardless of the presence of the batteries therein, in which case even when a battery is removed, the battery belt would not be severed.

FIG. 7 is a side view of a battery conduit 24 in accordance with some embodiments. Battery conduit 24 extends linearly in the direction L, and accommodates therein battery belt 16, constraining the motion of the battery belt also to the linear direction, as shown by the double-headed arrow D. In this manner, battery belt 16 can be inserted and removed from the battery conduit 24 to any extent desired, and the batteries therein shifted or stepped sequentially in either direction as detailed below.

Battery conduit 24 comprises individual battery conduit links 26, with each conduit link dimensioned to substantially correspond to one battery 10 on a 1-to-1 ratio basis for support of the battery therein. Other ratios are also contemplated—for example two or more batteries per link. Two conduit links 26, one of which contains a battery 10, are shown in more detail in FIG. 7A. Generally, each conduit link 26 includes opposing first and second major sides 28 and 30, and opposing first and second minor sides 32 and 34 that are generally all arranged to define a battery-conduit chamber therein. Considering the axial direction A-A of the battery, the first and second major sides 28 and 30 are generally in a parallel plane to the axial direction A-A, and the first and second minor sides 32 and 34 are generally in a transverse plane to the axial direction A-A. While the battery-conduit chamber is shown to be cuboid in shape, other shapes, such as cylinders, prisms, etc. are also contemplated, and the sides defining such a chamber would accordingly be configured differently from that described herein. Components (not shown) such as friction sliders, for example rails, to reduce friction and facilitate movement of batteries through the chambers; or for retaining batteries in place in the chambers, such as detents, springs, clamps, etc., can also be provided. In addition, expedients for cooling batteries in the conduit 24 can be provided, for example a cooling fluid circuit, cooling fins and heat sinks, and so on. In addition, a temperature management system including conduit-embedded sensors can be provided.

The sequence of conduit links 26 are constituted so as to establish an electrical connection among a select group or groups of the batteries 10, which may be referred to herein as the operational group, when the battery belt 16 is inserted into the battery conduit 24. The connection provides a collective "output" through which the batteries of the operational group can be electrically accessed for charging or discharging, or for testing. The connection may be series or parallel, although for brevity and clarity the focus of the description will be primarily the series connection. The term "discharge" is used to indicate use of the battery to provide power, for example to a motor of an electric vehicle, or to any device or component that requires electric power for operation.

Figure 7C:
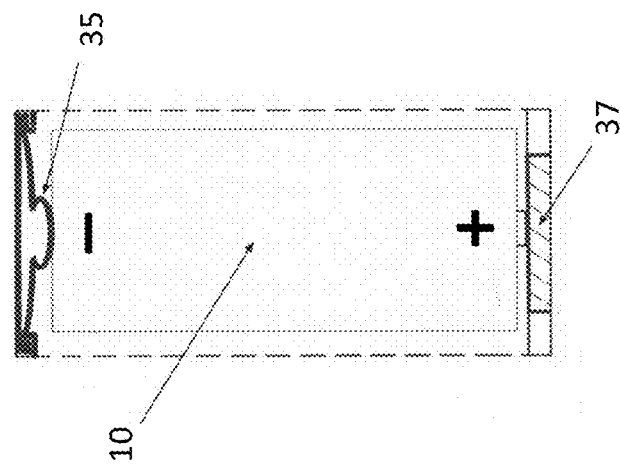
FIG. 7C is a schematic drawing showing a provision to maintain good electrical contact with a battery in accordance with certain embodiments.
Figure 7B:
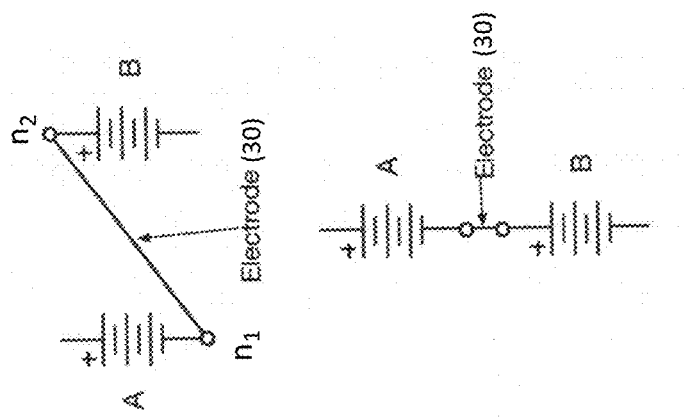
FIG. 7B is an electrical representation of the operation of links of a conduit in accordance with certain embodiments.
Figure 7A:
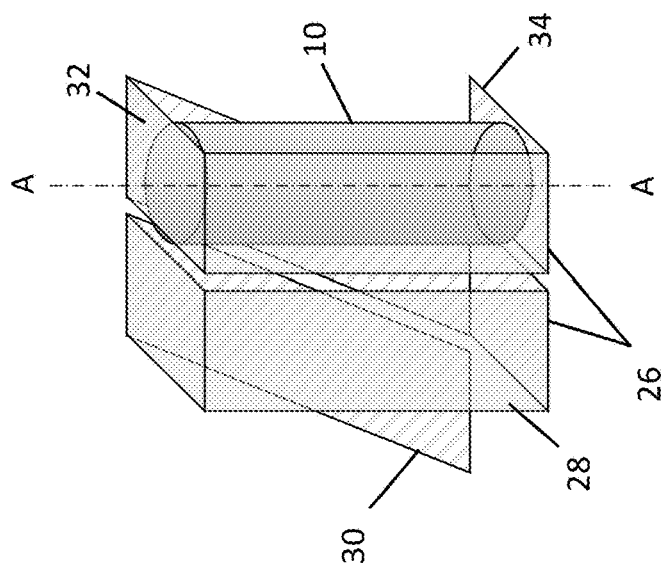
FIG. 7A is a view of details of two conduit links in accordance with certain embodiments.

To establish a serial connection of an operational group, minor sides 32 and 34 of each conduit link 26, or interior portions of the minor sides, are designed to electrically contact the positive and negative terminals of the battery in the conduit link. The minor sides 32 and 34, or the relevant portions thereof, are thus made of an electrically conducting material operable to contact the battery terminals. Major side 30, or a portion thereof, is also made of an electrically conducting material, and serves to provide an electrical connection between a conducting portion of a minor side 32 of one conduit link 26, and a conducting portion of a minor side 34 of a next conduit link in a sequence. For this reason, major side 30 may be referred to herein as the electrode, to be distinguished from the non-conducting major side 28, which mainly provides mechanical support. An electrical representation of this configuration, in which an electrically conducting path is established between a sequence of batteries by the conduit links is shown in FIG. 7B. Two consecutive batteries A and B are represented, connected in series by an electrode corresponding to a major side 30. The nodes $n_1$ and $n_2$ correspond to the minor sides 32 and 34, respectively.

Figure 7D:
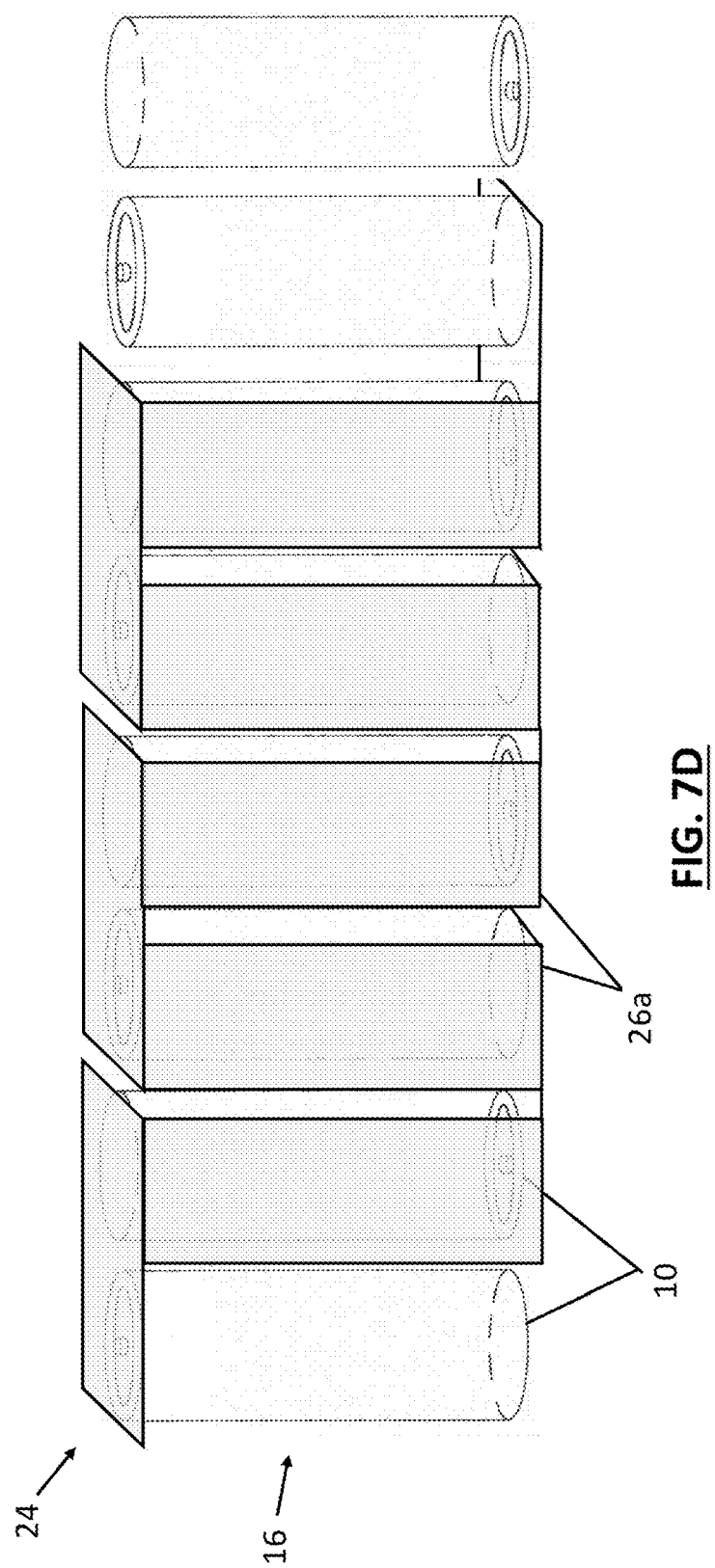
FIG. 7D is a schematic diagram showing sequentially reversed battery orientations in accordance with certain embodiments.

In addition to their electrical and mechanical function, in certain embodiments, some or all of the sides 28, 30, 32 and 34, are flexible enough to impart an overall flexible character to the conduit 24, so that it can assume compact coiled and other shapes as seen below. In other embodiments, the overall structure of the conduit 24 is rigid, and conduit links 26 and their connections to one another are inflexible. Provisions can be provided to maintain good electrical contact with the battery, as shown in FIG. 7C, wherein a conducting leaf-spring type of contact 35 exerts a bias toward the battery to ensure both the positive and negative terminals of the battery are in contact with the minor sides, or at least conducting portions such as 37 thereof. Of course forming a series connection of the batteries 10 of battery belt 16 for operation in a conduit can be accomplished in any number of ways. For instance, the battery orientations can be alternately reversed, as shown in FIG. 7D, with the conductivity and flexibility of the conduit links 26a and their sides adjusted accordingly.

As described supra, an effect of conduit 24 is to establish a series connection of the batteries 10 in belt 16 by connecting the positive terminal of each battery to the negative terminal of the next battery in the sequence; and by connecting the negative terminal of each battery to the positive terminal of the preceding battery in the sequence. A schematic illustration of this is provided in FIG. 8, which generally shows a system for deploying the batteries 10 of belt 16, for example for charging or discharging them. A conduit 24 establishes a series connection of ten 3.7 V batteries 10, designated A-J. The resulting 10-cell series-connected battery bank 36 has an output voltage of 37 volts at connections or taps P1 and N1, which may be collectively referred to as the output. By way of example only, four such 37-volt banks are shown in a series connection, resulting in a 148 V battery pack 38. The four banks thus connected can be constituted of four 10-cell battery belts 16 that are disposed in a single 40-link conduit 24, or four 10-cell battery belts 16 that are disposed in four corresponding 10-link conduits 24 connected in series.

Figure 9A:
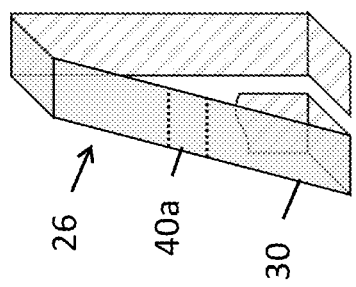
FIG. 9A is a schematic diagram showing a severable region of a major surface of a conduit link in accordance with certain embodiments.
Figure 9:
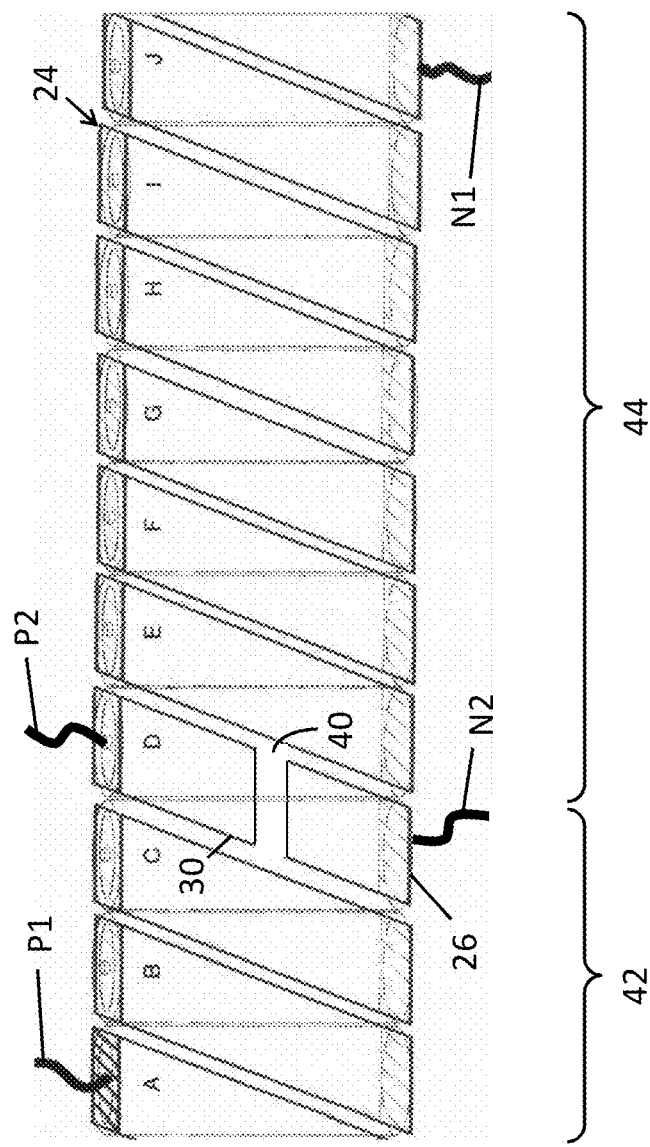
FIG. 9 is a schematic diagram showing a system for deploying the batteries by producing fractional outputs, or multiple operational zones, from a battery bank in accordance with certain embodiments.

FIG. 9 shows system for deploying the batteries by producing fractional outputs, or multiple operational zones, from a battery bank. In particular, a 10-cell bank of series-connected batteries A-J is disposed in a 10-link conduit 24, but with one of the links, 26, having an electrical gap or discontinuity 40 at electrode 30 thereof. With reference to FIG. 9A, the discontinuity can be selectively established by the user, for example when a pre-formed portion or region 40a of electrode 30 is removed, or is otherwise rendered electrically non-conductive. Each of the links in conduit 24 can have such a pre-formed region for selective removal by the user. The dotted lines defining the region 40a in FIG. 9A can represent perforations that facilitate removal of conductive material to establish the discontinuity. Returning to FIG. 9, electrical taps P2 and N2 are provided, which, operating together with the discontinuity 40, yield two separate power supplies: 3-cell power supply 42 (batteries A-C), having an output of 3.7 V×3=11.1 V at taps P1-N2; and 7-cell power supply 44 (batteries D-J), having an output of 3.7 V×7=25.9 V at taps P2-N1.

Figure 10:
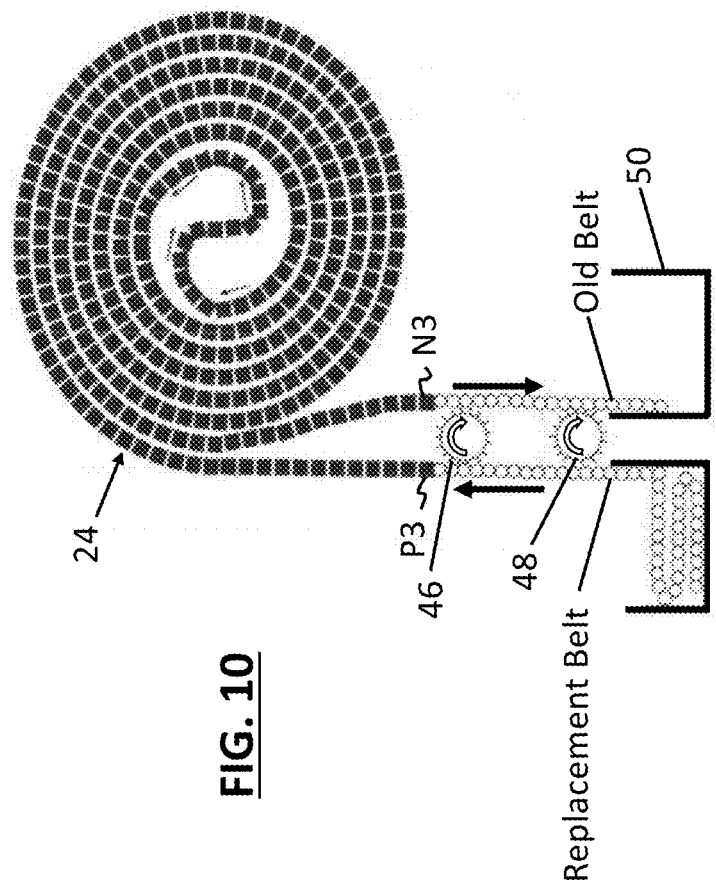
FIG. 10 is a schematic view of a system for deploying batteries that provides rapid battery change-out capability in accordance with some embodiments.

FIG. 10 is a schematic view of a system for deploying batteries that provides rapid battery change-out capability in accordance with some embodiments. Battery conduit 24 is shown in a coiled configuration and has a capacity of N batteries. One or both actuators 46 and 48, which in this example are sprockets that can be rotated in either direction, operate as powered drivers to simultaneously feed in a replacement battery belt, while extracting the old battery belt. The replacement and old belts are as previously described, and each has N batteries, such that for 3.7 V batteries, the voltage output at the P3-N3 nodes when a battery belt with N batteries is fully inserted is 3.7*N volts. The battery belts can be stored in bins 50 when outside the conduit 24. The conduit 24 may be a separable component from the actuators 46 and 48, such that conduit may be disposed at one installation, for example a charging station or electric vehicle, to which the actuators are brought by an operator for purposes of performing a battery belt change-out, and then removed from the installation. In certain embodiments, one or both actuators 46 and 48 are powered by motors (not shown). In certain other embodiments, neither actuator is powered by a motor, and the actuators are mounted for free rotation. Battery belt motion through conduit 24 in the latter configuration is powered by the operator, for example by pulling on the old belt, which causes drawing in of the new replacement belt, either because it can be linked to the old belt by a linking battery or link as described above, or because of the action of one or both actuators 46, 48, which engage the replacement belt and propel its motion into the conduit 24.

The rapid change-out configuration of FIG. 10 permits replacement of battery belts in the field, for example at an installation such as a charging station at which the conduit 24 is disposed, so that a replacement belt of depleted batteries can be inserted for charging through the P3-N3 nodes, and a charged ("old") belt with fresh batteries can be extracted for use, for example at a second installation such as an electric vehicle (not shown) that may be similarly equipped with a rapid change-out system, but with the output nodes thereof connected to the drive system of the vehicle. The vehicle may have multiple such rapid change-out systems, in a coil or other configuration, that can be connected in any suitable power extraction manner (for example series, parallel, fractional, etc.).

Figure 11:
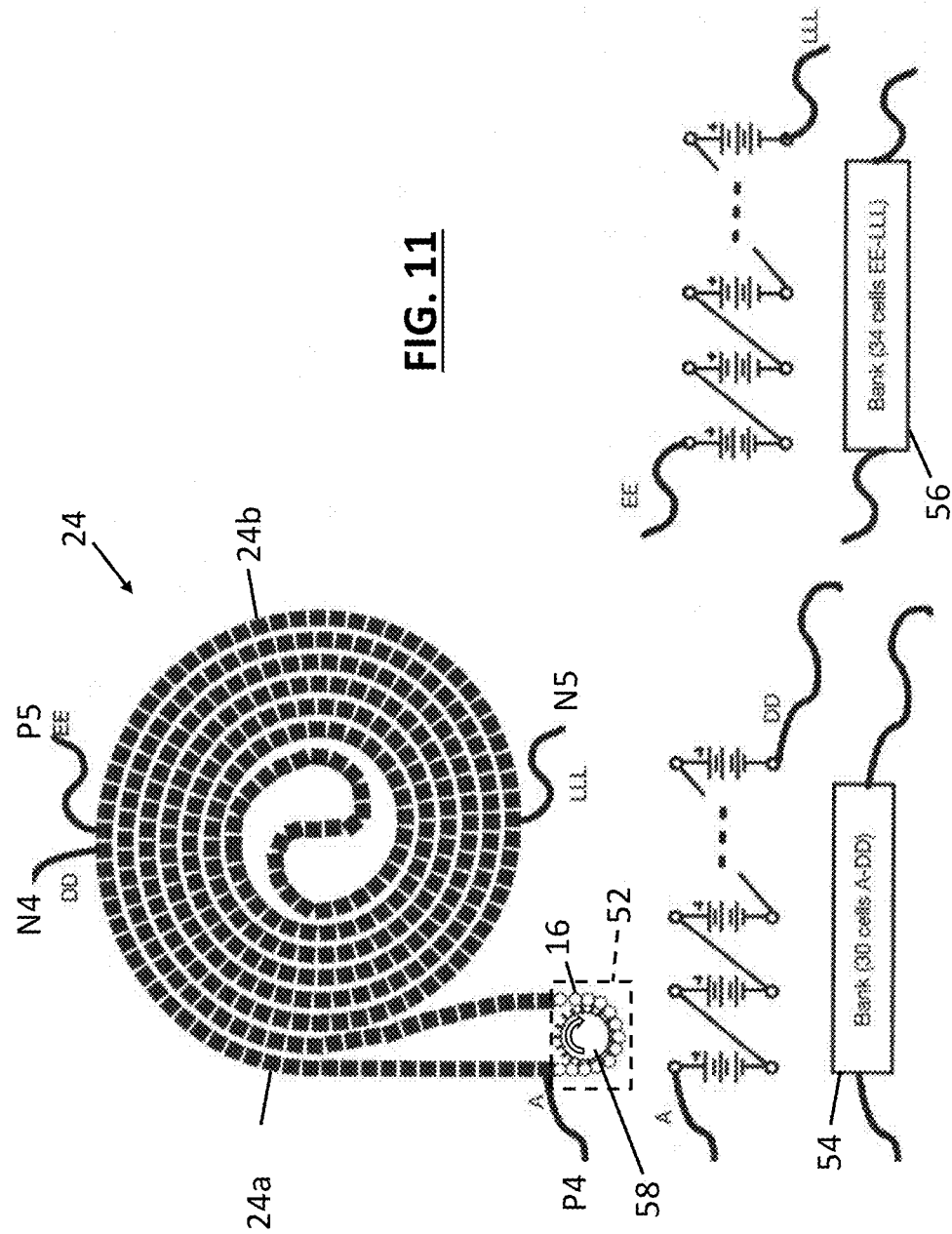
FIG. 11 is a schematic view of showing a variation of a system for deploying batteries that provides rapid battery change-out capability with fractional output and multiple operational and/or rest zones in accordance with some embodiments.

FIG. 11 is system for deploying batteries having a coiled fractional output configuration in accordance with certain embodiments. Battery belt 16 has an "endless" configuration, and includes B total batteries mechanically linked together as described above. Belt 16 is housed in conduit 24 having N conduit links each defining a battery chamber, also as described above. The number of total batteries B exceeds the number of conduit links N by an excess battery amount $B_E$. That is, $$B_E = B - N$$

The excess batteries BE are accounted for in access region 52. Because the batteries in this region are outside of conduit 24, they are more accessible and can be easily replaced, for example when they have failed or they are underperforming. A battery exchange can be implemented in this region by simply sliding an individual battery out of the belt axially as described in FIG. 5, or laterally as described in FIG. 6, and replacing it with a new battery in reverse manner. Battery monitoring and replacement are discussed in more detail infra.

Conduit 24 as shown in FIG. 11 is electrically comprised of two segments, 24a and 24b, which are isolated from one another by a discontinuity, such as gap 40 in a conduit link 26 as described in FIG. 9. This results in a first battery bank 54 of 30 cells A-DD (111 volts); and a second battery bank 56 of 34 cells EE-LLL (125.8 volts). The two banks, each connectable for operation at nodes P4-N4 and P5-N5, respectively, can independently and/or simultaneously undergo charging or discharging depending on the application. The total number of batteries that are connected for operation in this manner, referred to as $B_O$, is 30+34=64. The number M of conduit links (and corresponding chambers) of conduit 24 exceeds the number $B_O$=64 of operational batteries. This excess of conduit links can be expressed as $$M_E = M - B_O$$

The excess conduit links $M_E$ can be used to hold batteries on stand-by, in resting mode, for example for cooling a portion of the batteries while those in banks 54 and/or 56 are being utilized for charging and/or discharging (operational mode). The batteries can thus be cycled into position in conduit 24 by motorized actuator 58, which can be coupled to one or more battery temperature or other parameter sensors, a timer, or other device (not shown) for providing feedback and triggering the rotation of the actuator. Logic and position encoders (not shown) can be provided to determine the number of positions the batteries of battery belt 16 should be shifted in conduit 24 through action of motorized actuator 58. The conduit 24 may be a separable component from the actuator 58, such that the conduit may be disposed at one installation, for example a charging station or electric vehicle, to which the actuator 58 is brought by an operator for purposes of performing a battery belt change-out, and then removed from the installation. A change-out would entail removal of one of the batteries 10 at the access zone 52, severing the battery belt 16 and enabling its removal and replacement in the manner described above in connection with FIG. 10.

Figure 12:
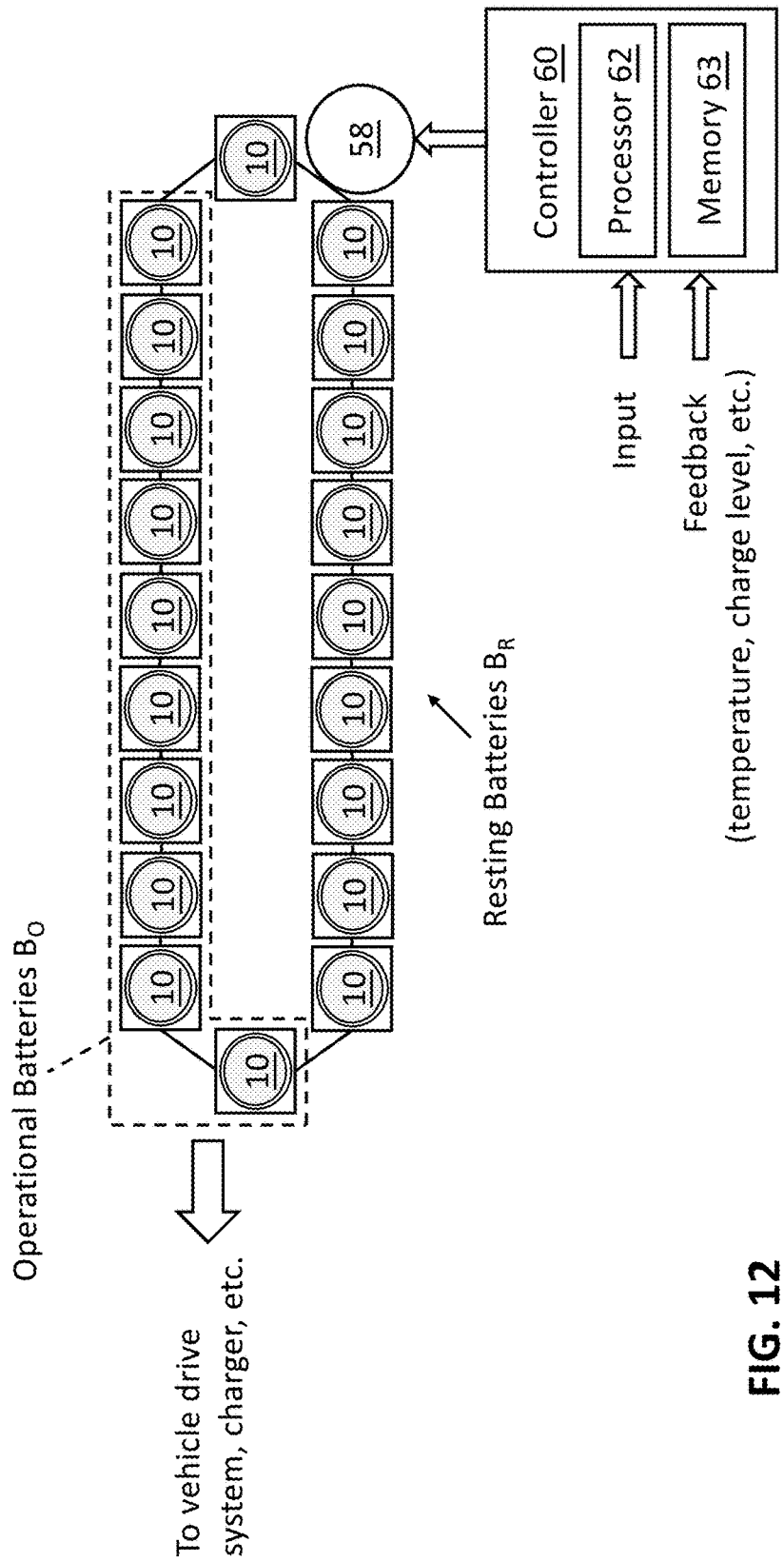
FIG. 12 is a generalized view showing a battery control system for use in a deployment system in accordance with certain embodiments.

A generalized view showing a battery control system for use in a deployment system is schematically provided in FIG. 12. A controller 60 can include a processor 62 for receiving the feedback information and other input and implementing the logic, with the controller activating the actuator 58 accordingly. A memory 63 in the controller can store various operating information that can be used to track movement of the belt 16 and to track positions or chambers therein, as detailed further below. Acceptance thresholds for various parameters, relating to temperature, voltage, current, power, and so on, can also be stored in memory 63. Actuator 58 is rotatable bi-directionally, depending on the cycle and the application. The dashed lines delineate an active or operational zone encompassing a set of batteries $B_O$ that are connected for operation, as part of one or more independent battery banks, while the remaining batteries BR outside the active zone are at rest, in a resting zone, for a cooling cycle for example. Operation can entail a connection to a charging system for charging the batteries, for example one sub-group at a time, in the case of limited charger capacity, until the entirety of the batteries are charged; or to a discharging system such as a drive system including an electric motor of a vehicle, and so on. At an appropriate time, sensed temperature, or charge/discharge level, power, current, voltage, or any other suitable shifting parameter, the controller activates actuator 58 to shift all or some of the batteries in order to move resting batteries into operational mode (into the active zone), and move operational batteries to resting mode (out of the active zone). While the ratio of operational batteries to resting batteries is shown to be 1 ($B_O/B_R$=10/10=1) in this example, other ratios greater than or less than one are contemplated. As mentioned above, sensors embedded in the conduit 24 can be provided as part of a temperature management system providing feedback information to controller 60.

Figure 12A:
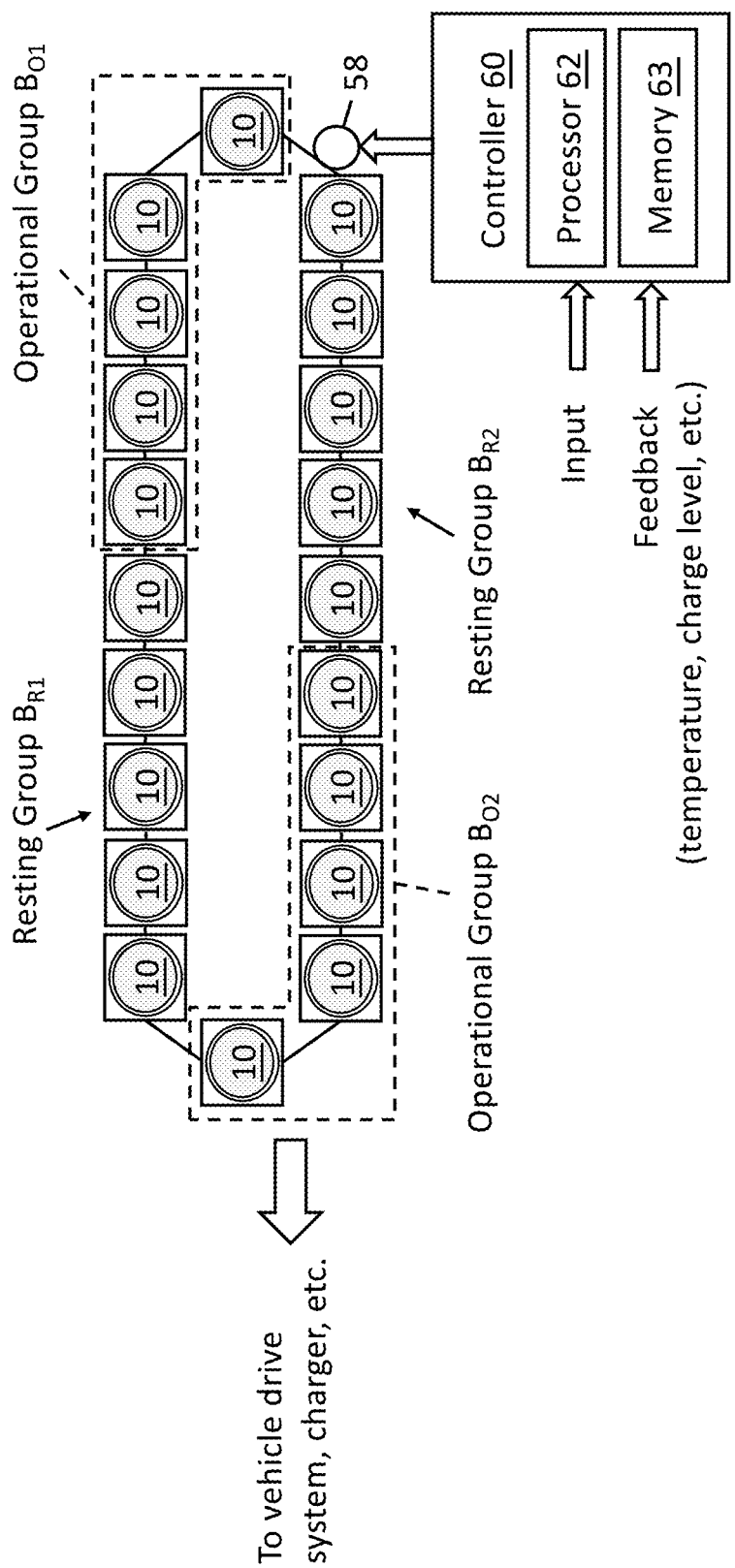
FIG. 12A is a variation showing a generalized view of a battery control system for use in a deployment system in accordance with certain embodiments, in which four 5-battery groups are used.

In the variation of FIG. 12A, four 5-battery groupings are achieved: two resting groups $B_{R1}$ and $B_{R2}$; one charging operational group $B_{O1}$; and one discharging operational group $B_{O2}$. Actuator 58 can be activated by controller 60 to shift the batteries S places every n minutes, or whenever the temperature of any one or more batteries in any of the groups reaches a prescribed threshold, or whenever a discharging battery level (voltage, current) or a charging battery level reaches a prescribed threshold, or based on any combination of these and other factors. In addition, depending on where the system is installed, the controller 60 can receive input from a battery charger, or from a controller of a vehicle in which the system is disposed, and perform the battery shifting in response to this input. The number of shifts S can be any integer greater than zero. In the example of FIG. 12A, a 5-place shift would invert the battery configuration, placing all the operational batteries in rest positions, and all the resting batteries in operational positions. This may be referred to as a 180-degree phase shift. Different degree phase shifts are also contemplated. A 90-degree phase shift would place half the operational batteries in rest positions, and half the resting batteries in operational positions, and so on.

In the arrangements as described herein, the mobility of the batteries 10 relative to the tap points from which they are deployed for charging or discharging confers important advantages in leveling out the stress and wear on the cells in the battery pack, and increasing their useful life. In particular, in conventional battery packs, the position of the cells is static, both physically and electrically. Since current flux (draw on discharge and the opposite on charge) and thermal flux (heating on charge and discharge) that cells experience differ as a function of their position in the circuit, those that are in one position (for example at the edge of the battery pack, at the tap point for charge/discharge) will experience different thermal, chemical and mechanical stresses than those at another position (for example at the center of the pack) during operation. Similarly, the physical position of cells relative to the cooling system employed (including ambient cooling) in the pack will also be different, such that even when a heat exchanger system is employed, its cooling will likely be uneven—for example more cooling at its inlet than its outlet—and some cells will benefit less from the cooling than others. This stasis of the physical and electrical positions in conventional systems results in uneven wear of the individual cells and premature failure of the cells and battery pack. The dynamic arrangements described herein obviate these problem, providing wear-leveling by rotating the batteries so that the stress positions (thermal, electrical, mechanical, chemical) in the pack are not occupied by the same batteries all the time, but are shared by the batteries as they are rotated into and out of these positions.

Figure 13:
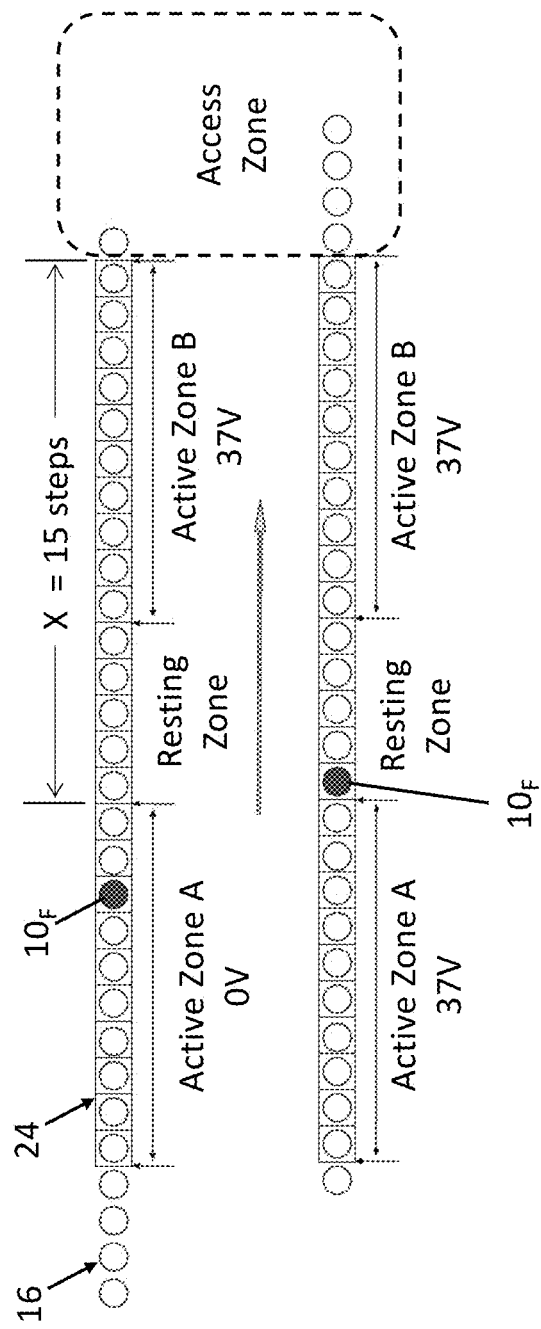
FIG. 13 is a schematic view showing a procedure for detection, shifting, and replacement of an underperforming battery in accordance with certain embodiments.

An additional advantage of certain embodiments is easy removal and replacement of failed or underperforming batteries. Detecting such batteries can be done on an individual battery test basis, wherein the controller 60 (FIG. 12) can cycle the batteries of the belt 16 through an access zone 52 equipped with temperature, voltage, current, and other sensors, and those batteries that fail certain criteria are replaced. In some embodiments, for a series-connected bank of batteries, a failure of one or more batteries in the bank will yield a zero voltage across the entire bank without identifying the specific failed battery. A simple approach to identify the failing battery in such a scenario is described with reference to FIG. 13. The failed battery $10_F$ of battery belt 16 is sequentially stepped through the conduit 24 by the controller 60 (FIG. 12) and enters active operational Zone A (upper drawing in the figure). Operational Zone A will exhibit an uncharacteristically low (zero) voltage as long as the failed battery $10_F$ is within it. This uncharacteristically low voltage, or any other parameter relating to Zone A that indicates a malfunctioning battery within it, can be sensed by appropriate algorithms in controller 60, or by sensors providing their output to controller 60. After three shifts (lower drawing in the figure), or steps, of battery belt 16 to the right, the failed battery will depart Zone A, and the voltage (or other suitable parameter) of Zone A will be restored to 37V. At this third shift, because of the restoration of the voltage to 37V, the identity of the offending battery becomes known to the controller, which then registers this battery as one requiring replacement. Registering the battery as such can simply mean tracking in memory 63 the battery chamber or location as one that contains a defective battery, or tracking the belt position, and so on. The controller 16 can then advance the battery belt 16 until the registered defective battery ($10_F$) reaches the Access Zone for replacement, either manually or by an exchanger as further detailed below. The controller 60 knows the distance X, in number of steps, from the end of Zone A to the Access Zone, which in this example is fifteen steps or positions. Such distance X is pre-stored in memory 63. The controller 60 advances the battery belt fifteen steps to deliver the battery 10F to the Access Zone.

Figure 14:
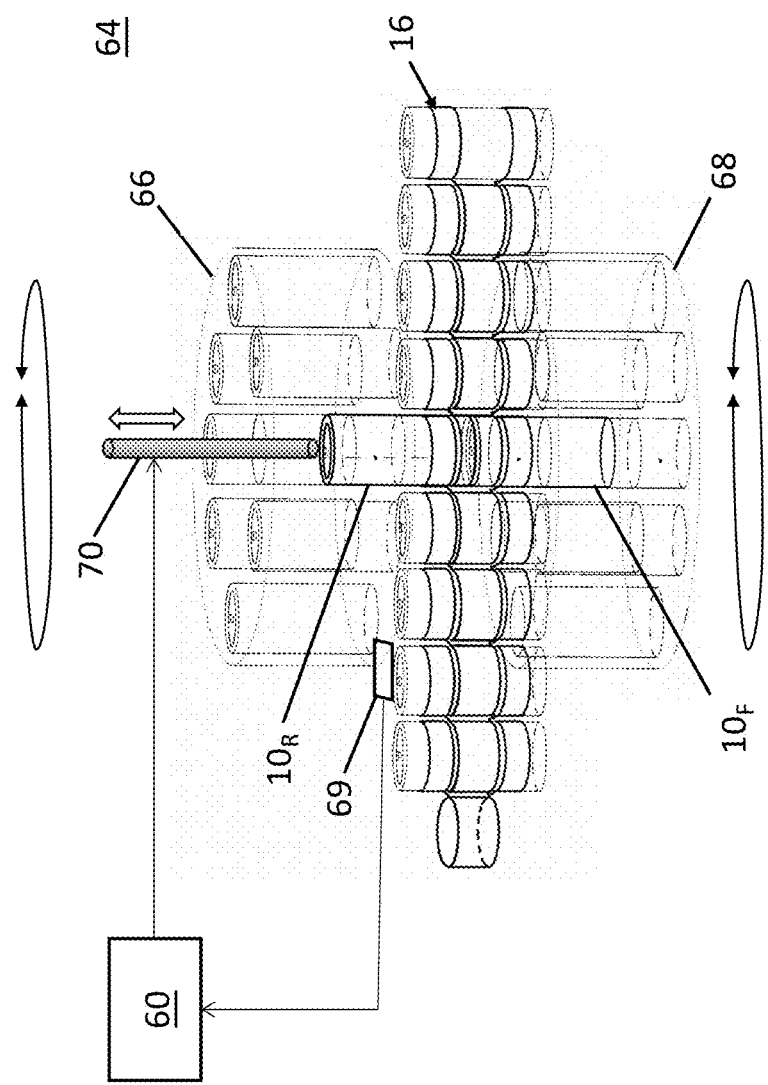
FIG. 14 is a schematic diagram of an automatic battery exchanger 64 that may be disposed in an access zone in a battery deployment system in accordance with some embodiments.

FIG. 14 is a schematic diagram of an automatic battery exchanger 64 that may be disposed in an access zone in a battery deployment system in accordance with some embodiments. The exchanger includes a fresh battery reservoir 66 and a depleted battery reservoir 68. As the battery belt 16 is stepped through the exchanger under control of controller 60, a battery $10_F$ that has been earmarked for replacement reaches alignment with a fresh replacement battery $10_R$. A push rod 70 is then actuated, forcing the replacement battery $10_R$ to occupy the position of battery $10_F$ in the belt 16, and forcing the battery $10_F$ out of the belt altogether and into the depleted battery reservoir 68. In some embodiments, the push rod 70 only acts on a battery in the belt, without pushing a replacement battery into its place. In this manner a battery is removed from the belt 16, and the belt is automatically severed in the manner described above. In some embodiments a sensor 69 is included, for example with the exchanger 64, for detecting parameters such as temperature, voltage, or current of batteries as they pass on belt 16. The sensor output is provided as feedback to the controller 60 as described above.

In certain embodiments, one or both reservoirs 66 and 68 are rotatable, in either direction (shown by the circular arrows), for example under control of a controller such as controller 60. The rotation of reservoir 66 enables the selective placement of batteries 10 in position for insertion into the belt 16. For example, after a first replacement battery is inserted into a position in the belt by action of the rod 70, the reservoir 66 is rotated to place a second replacement battery in position for insertion into the belt. The belt 16 of course is shifted any number of steps (one or more) to the new location that needs to receive the second replacement battery. Push rod 70 is then actuated again, and the second replacement battery is pushed into position in the belt, replacing the battery already at that location in the belt. Similarly, the rotation of reservoir 68 enables the selective placement of empty slots in the reservoir for receiving the batteries being replaced.

Figure 15:
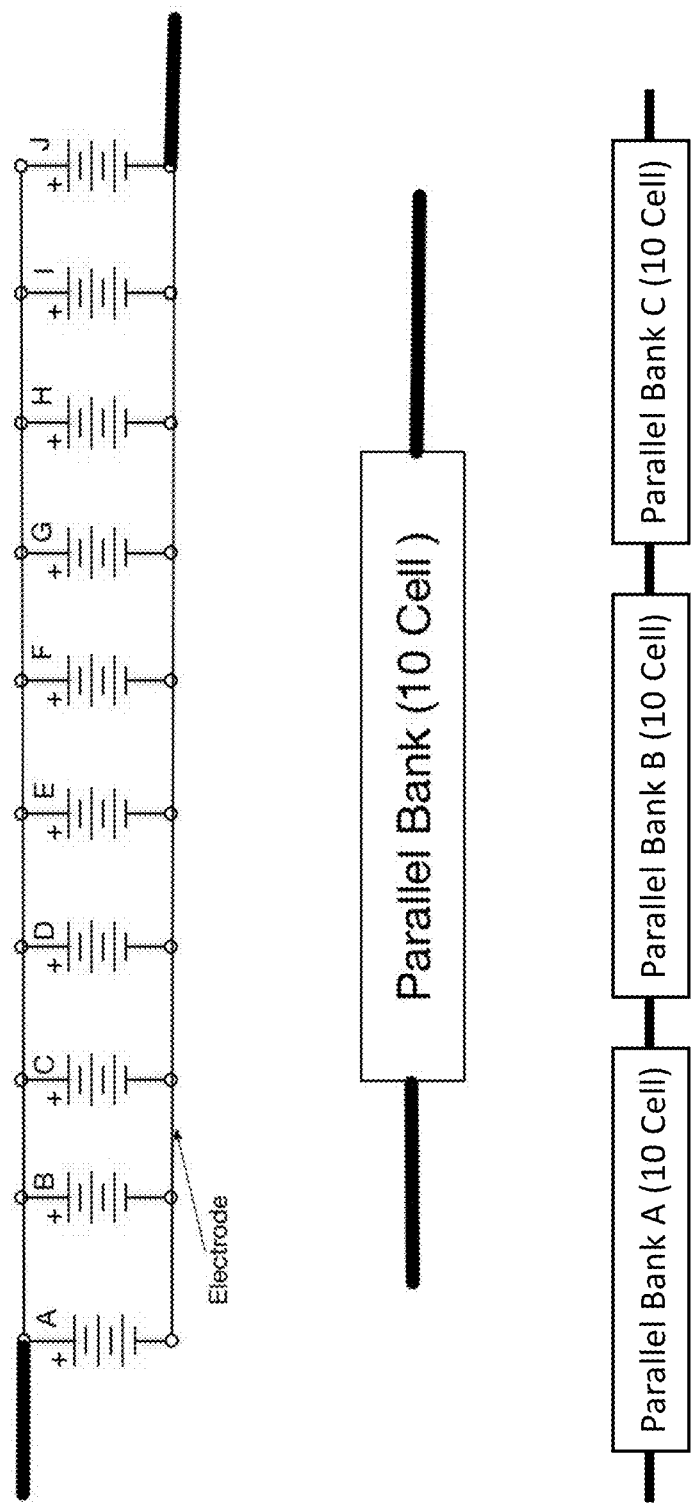
FIG. 15 is an electrical schematic of a parallel-connected battery bank, and a parallel/series combination of battery banks, in accordance with certain embodiments.
Figure 16:
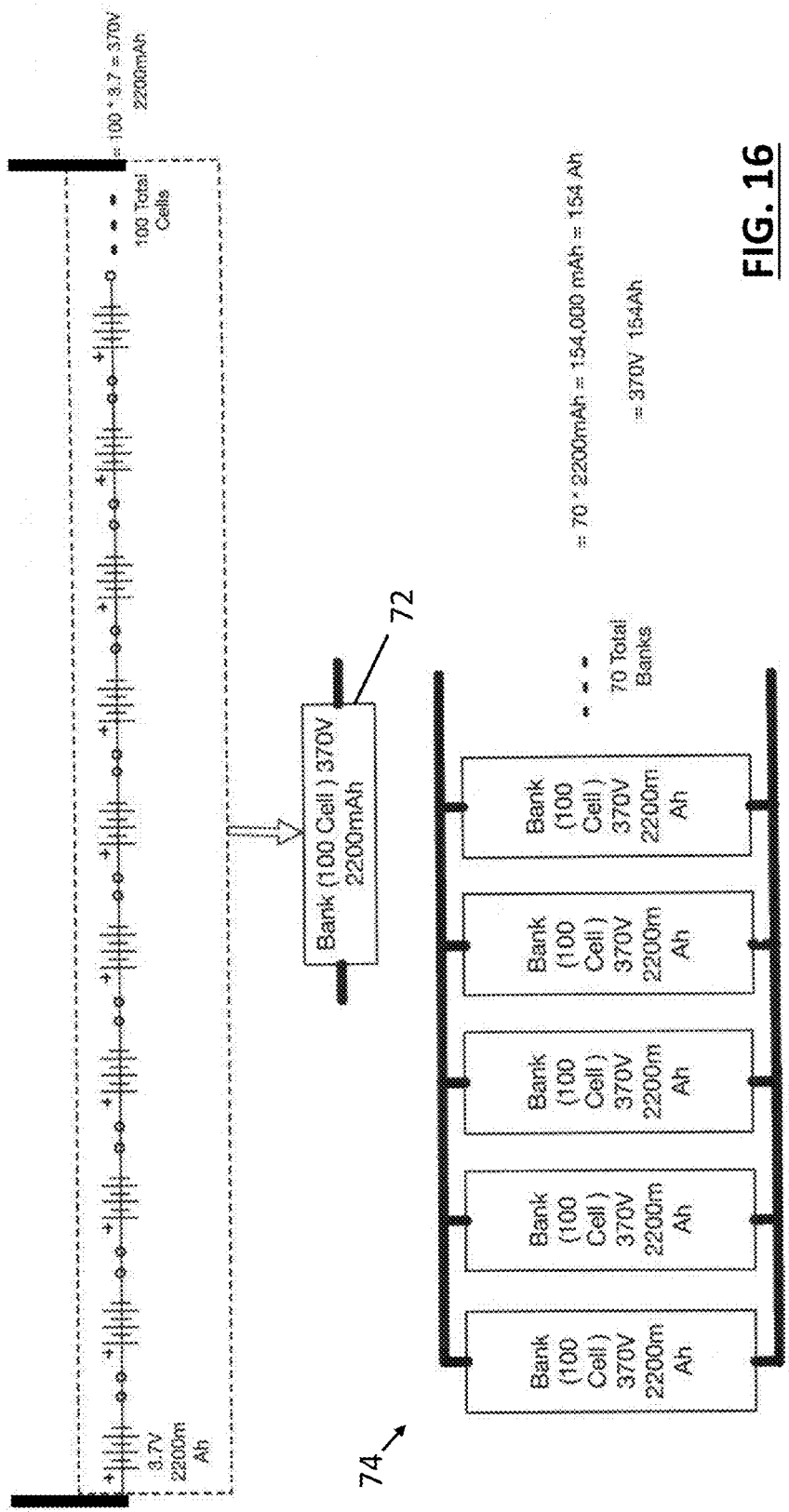
FIG. 16 is an electrical schematic of a combination series/parallel arrangement in accordance with certain embodiments.

In certain embodiments of a battery deployment system, parallel battery connections, or combinations of parallel and series battery connections, are contemplated. In a series connection, the total voltage of a battery bank is a multiple of the individual voltages; in a parallel arrangement, the total voltage across a battery bank is the same, regardless of the number of batteries in the bank, but the current is a multiple of the individual battery currents. A parallel bank is illustrated in FIG. 15, wherein 10 batteries, each rated at 3.7 V and 2200 mAhr (milliamp hours), are connected to yield a power supply of 3.7 V and 22 Ahr. A combination parallel/series arrangement is shown in the lower portion of FIG. 15, wherein three parallel banks A-C are connected in series with each other. While the banks have ten cells each, the number of cells in each bank can be different and can vary from bank to bank. A combination series/parallel arrangement is shown in FIG. 16. A series-connected bank 72 consists of 100 batteries, each rated at a voltage of 3.7 V and a current of 2200 mAh. The total rating of the bank 64 is 370 volts at 2200 mAh. Connecting 70 of these banks 72 in series yields a power source 74 rated at 370 volts at 154 Ah.

Figure 17:
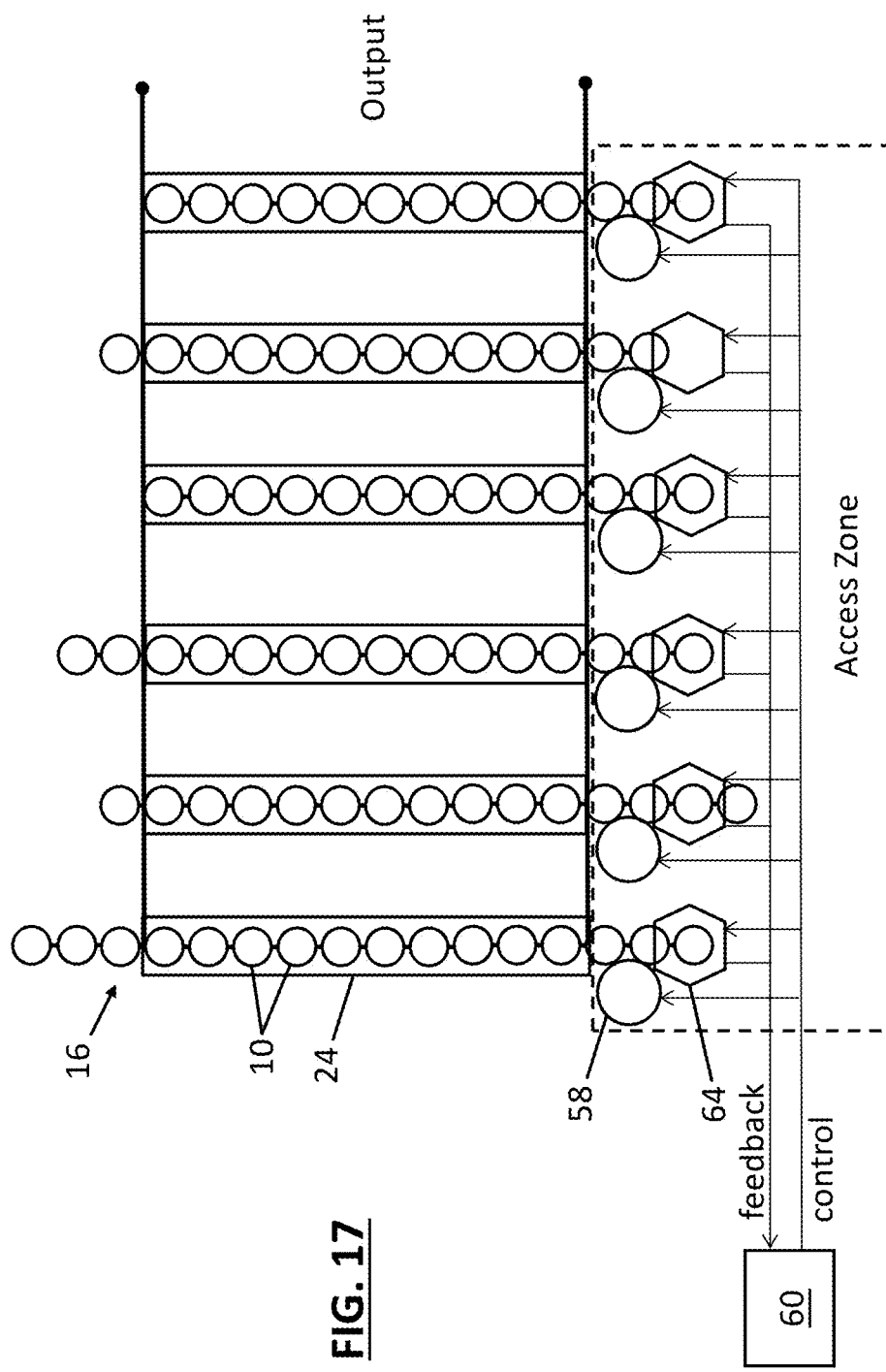
FIG. 17 is a schematic diagram of a battery management system for use in a battery deployment system in accordance with some embodiments.

A battery management system for use in a battery deployment system in accordance with some embodiments is shown schematically in FIG. 17. Each of six belts 16 of batteries 10 is shown in a corresponding conduit 24. Each of the six conduits establishes a series connection of the ten batteries therein. The conduits are connected together in parallel to provide a combination series-parallel connection output, for example for driving an electric vehicle, or for connection to a charger for charging the batteries. In an alternative configuration, one or more of the six conduits 24 is not connected to the others, so that a different, independent electrical circuit is established. Such an alternative arrangement permits a "hot swap" of some of the batteries, wherein some batteries can be swapped out while others continue to be connected and operational, for example to drive a motor or to be charged.

Controller 60 drives six corresponding actuators 58 independently of each other in order to cycle the batteries in the six belts through resting zones for cooling, or through operational zones for charging and discharging, as described above. Controller 60 also drives six corresponding exchangers 64 independently of each other in order to selectively replace batteries in the belts 16 as necessary, for instance based on sensed temperature, voltage, current, and other parameters. Feedback from sensors 69 (FIG. 14) can be provided to the controller 60 to assist in its decision-making and control of the actuators 58 and exchangers 64. An advantage of the combination series-parallel connection of FIG. 17 is that it permits rapid change out of the series-connected batteries in each of the individual belts 16, while at the same time enabling a high current parallel connection of the belts 16 to each other.

While embodiments and applications have been shown and described, it would be apparent to those skilled in the art having the benefit of this disclosure that many more modifications than mentioned above are possible without departing from the inventive concepts disclosed herein. The invention, therefore, is not to be restricted based on the foregoing description.

What is claimed is:

1. A system for deploying batteries comprising:
    a battery belt for mechanically linking multiple batteries together;
    a conduit having a plurality of conduit links that are electrically connected together, the conduit comprising an operational zone with an output, the operational zone establishing an electrical connection between the output and batteries in the operational zone; and
    an actuator for selectively moving batteries into and out of the operational zone,
    wherein the conduit includes an additional operational zone, the actuator selectively moving batteries into and out of the additional operational zone.

2. The system of claim 1, wherein the battery belt links the batteries together in a linear arrangement, and the conduit extends in a linear direction and constrains movement of the battery belt therein to the linear direction.

3. The system of claim 1, wherein the conduit includes a resting zone, the actuator selectively moving batteries into and out of the resting zone.

4. The system of claim 1, further including a controller for activating the actuator.

5. The system of claim 4, wherein the controller activates the actuator based on input received from one or more of an electric vehicle, a battery charger, and a sensor of parameters associated with one or more of the batteries, said parameters selected from one or more of temperature, voltage, current, and power.

6. The system of claim 1, further including an exchanger for removing one or more batteries from the battery belt.

7. The system of claim 6, wherein removal of a battery severs the battery belt.

8. A method for deploying batteries comprising:
    mechanically linking a first set of batteries together using a battery belt;
    using an actuator to move the battery belt in a linear direction through a conduit having a plurality of conduit links that are electrically connected together and having an operational zone in which batteries are electrically coupled together and to an output of the operational zone; and
    using the actuator to move the battery belt through an additional operational zone of the conduit.

9. The method of claim 8, further comprising using the actuator to move the battery belt through a resting zone of the conduit.

10. A method for cycling batteries through multiple zones, comprising:
    mechanically linking a plurality of batteries to one another in a battery belt; and
    simultaneously moving the mechanically-linked plurality of batteries to:
        dispose a first subset of batteries of the plurality in a first operational zone in which the batteries of the first subset are electrically connected together and to an output of the operational zone, and
        dispose a second subset of batteries of the plurality in an additional zone different from the first operational zone.

11. The method of claim 10, further comprising charging the first set of batteries in the first operational zone.

12. The method of claim 10, further comprising discharging the first set of batteries in the first operational zone.

13. The method of claim 10, wherein the additional zone is a resting zone in which the second subset of batteries are not electrically loaded.

14. The method of claim 10, wherein the additional zone is an access zone, the method further comprising:
    disposing an exchanger in the access zone for removing one or more batteries.

15. The method of claim 14, further comprising:
    using the exchanger to replace at least one removed battery with a replacement battery.

16. The method of claim 15, wherein the exchanger includes a replacement battery reservoir, the method further comprising:
    rotating the replacement battery reservoir to register a replacement battery in position to replace a depleted battery in the access zone; and
    displacing one of the mechanically linked batteries with the replacement battery.

17. The method of claim 10, further comprising:
    simultaneously moving the mechanically-linked plurality of batteries to:
        dispose a third subset of batteries of the plurality in a second operational zone in which the batteries of the third subset are electrically connected together and to an output of the second operational zone.

18. The method of claim 17, further comprising charging the first set of batteries in the first operational zone while discharging the third subset of batteries in the second operational zone.

19. The method of claim 10, further comprising:
    storing a number of steps from the first operational zone to the additional zone;
    detecting a parameter at the first operational zone indicative of a malfunctioning battery in the first operational zone;
    moving the plurality of batteries until the detected parameter indicates that the malfunctioning battery is outside the first operational zone; and
    moving the plurality of batteries the stored number of steps.

20. A system for deploying batteries comprising:
    first and second conduits respectively disposed at first and second locations remote from one another, each of the first and second conduits having:
        a first operational zone with a first output, and
        a plurality of chambers extending in a linear direction and configured to receive batteries of a battery belt into the first operational zone, through linear motion of the battery belt into the conduit, to thereby establish an electrical connection between the first output and batteries in the first operational zone;
    a battery charger electrically couplable to the first operational zone of the first conduit; and
    a battery discharger electrically couplable to the first operational zone of the second conduit.

21. The system of claim 20, wherein at least one of the first or second conduits includes at least one of a resting zone or a second operational zone with a second output.

22. The system of claim 20, further comprising:
    an actuator for selectively moving batteries into and out of the first operational zone of the first or second conduit.

23. The system of claim 22, further including a controller for activating the actuator.

24. The system of claim 23, wherein the controller activates the actuator based on input received from one or more of an electric vehicle, a battery charger, and a sensor of parameters associated with one or more of the batteries, said parameters selected from one or more of temperature, voltage, current, and power.

25. The system of claim 20, further including an exchanger for removing a battery from the battery belt.

26. The system of claim 25, wherein the exchanger is configured to replace the removed battery with a replacement battery.

27. The system of claim 20, further comprising a second conduit disposed at the same location as the first conduit, the second conduit having a second operational zone with a second output, the second operational zone establishing an electrical connection between the second output and batteries in the second operational zone, wherein the first operational zone establishes a series connection of the batteries therein and the second operational zone establishes a series connection of the batteries therein, and wherein the first operational zone is connected in parallel with the second operational zone.

28. The system of claim 20, further comprising a second conduit disposed at the same location as the first conduit, the second conduit having a second operational zone with a second output, the second operational zone establishing an electrical connection between the second output and batteries in the second operational zone, wherein the first operational zone establishes a parallel connection of the batteries therein and the second operational zone establishes a parallel connection of the batteries therein, and wherein the first operational zone is connected in series with the second operational zone.

* * * * *